(12) United States Patent
Temblador et al.

(10) Patent No.: US 8,303,330 B2
(45) Date of Patent: *Nov. 6, 2012

(54) PIERCING CONNECTOR FOR CONTINUOUS FLEXIBLE BUS

(75) Inventors: Richard Temblador, Carrollton, GA (US); John R. Carlson, Newnan, GA (US); Jeffrey D. Herrin, Carrollton, GA (US); Randy D. Kummer, Villa Rica, GA (US)

(73) Assignee: Southwire Company, Carrollton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,892

(22) Filed: Sep. 27, 2011

(65) Prior Publication Data

US 2012/0028493 A1   Feb. 2, 2012

Related U.S. Application Data

(63) Continuation of application No. 13/076,486, filed on Mar. 31, 2011, now Pat. No. 8,025,524, and a continuation of application No. 12/580,357, filed on Oct. 16, 2009, now Pat. No. 7,922,516.

(60) Provisional application No. 61/106,249, filed on Oct. 17, 2008.

(51) Int. Cl.
*H01R 4/24* (2006.01)
*H01R 4/26* (2006.01)
*H01R 11/20* (2006.01)

(52) U.S. Cl. .................................... 439/431; 439/391

(58) Field of Classification Search .............. 439/431, 439/425, 426, 427, 391, 411
See application file for complete search history.

(56) References Cited

U.S. PATENT DOCUMENTS

| | | | |
|---|---|---|---|
| 2,581,024 A | | 1/1952 | Joyce |
| 3,860,739 A | | 1/1975 | Kloth et al. |
| 3,922,478 A | * | 11/1975 | Perkey ............................ 174/53 |
| 4,075,758 A | | 2/1978 | Parsons et al. |
| 4,245,880 A | | 1/1981 | Zimmerman et al. |
| 4,669,804 A | | 6/1987 | Munroe |
| 4,758,536 A | | 7/1988 | Miller et al. |
| 5,556,297 A | | 9/1996 | Bray et al. |
| 6,259,023 B1 | | 7/2001 | Reiker |
| 6,551,124 B1 | | 4/2003 | Gossmann |

(Continued)

FOREIGN PATENT DOCUMENTS

DE   195 04 013 C1   7/1996

(Continued)

OTHER PUBLICATIONS

International Search Report dated Jan. 31, 2011 cited in Application No. PCT/US2009/060992.

*Primary Examiner* — Hae Moon Hyeon

(74) *Attorney, Agent, or Firm* — Merchant & Gould

(57) ABSTRACT

A continuous flexible bus comprises, for example, a plurality of metal clad flexible conductors. A device, such as a switch for example, is connected to the continuous flexible bus. In order to connect the device to the continuous flexible bus, at least one piercing connector is used, for example. The at least one piercing connector is configured, for example, to pierce one of the plurality of flexible metal clad conductors. Once the one of the plurality of flexible metal clad conductors is pierced, the at least one piercing connector causes, for example, an electrical connection between an electrical conductor in the pierced one of the plurality of flexible metal clad conductors and the switch.

13 Claims, 17 Drawing Sheets

U.S. PATENT DOCUMENTS

| | | |
|---|---|---|
| 6,617,511 B2 * | 9/2003 | Schultz et al. .................. 174/53 |
| 6,648,672 B1 | 11/2003 | Meinke |
| 6,792,838 B2 | 9/2004 | Brooks et al. |
| 7,232,336 B1 | 6/2007 | Evans |
| 7,699,635 B2 | 4/2010 | Weaver et al. |
| 7,922,516 B2 | 4/2011 | Temblador et al. |
| 8,025,524 B2 | 9/2011 | Temblador et al. |
| 2010/0093206 A1 * | 4/2010 | Chuen ........................... 439/391 |
| 2010/0099296 A1 | 4/2010 | Temblador et al. |
| 2011/0177713 A1 | 7/2011 | Temblador et al. |

FOREIGN PATENT DOCUMENTS

| | | |
|---|---|---|
| DE | 201 16 392 U1 | 12/2001 |
| EP | 1 403 971 A2 | 3/2004 |
| WO | WO 95/15594 | 6/1995 |

* cited by examiner

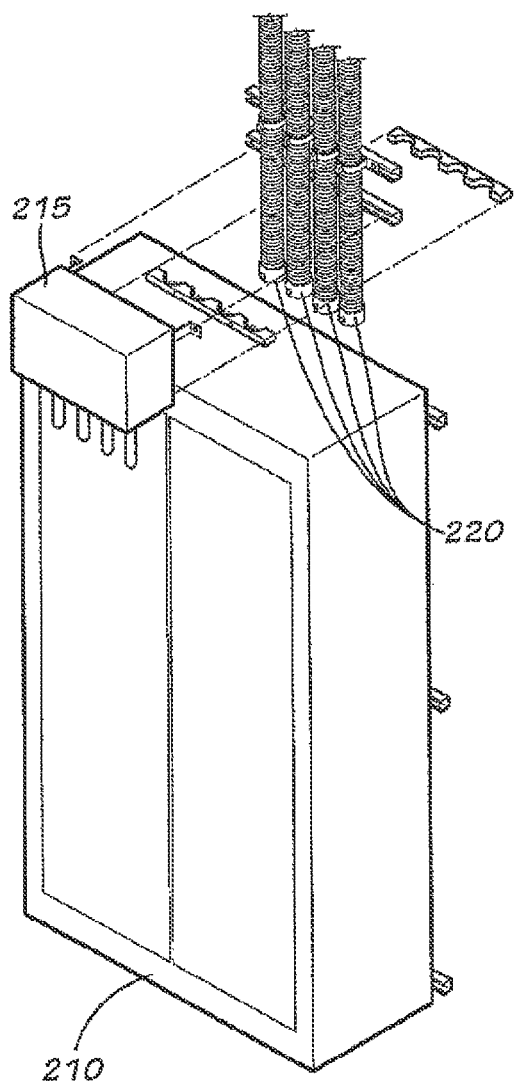 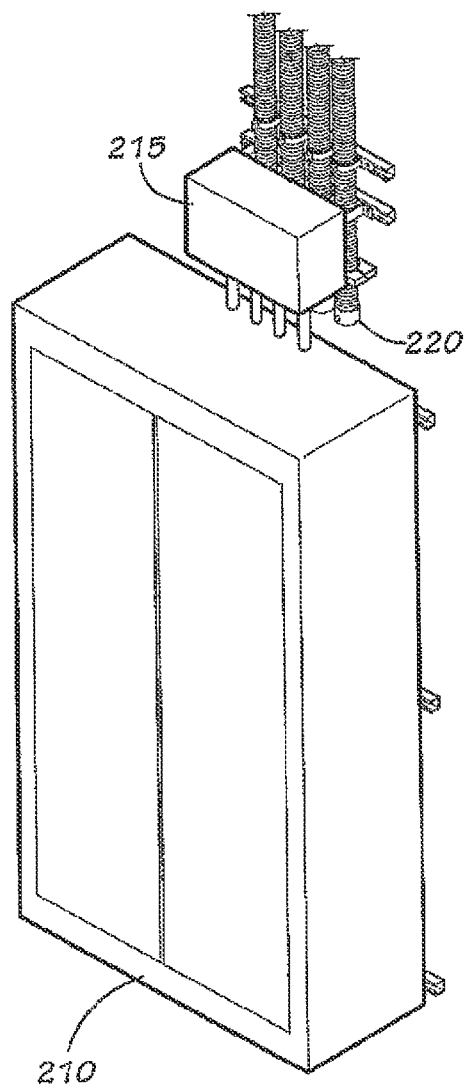
FIG. 3A  FIG. 3B

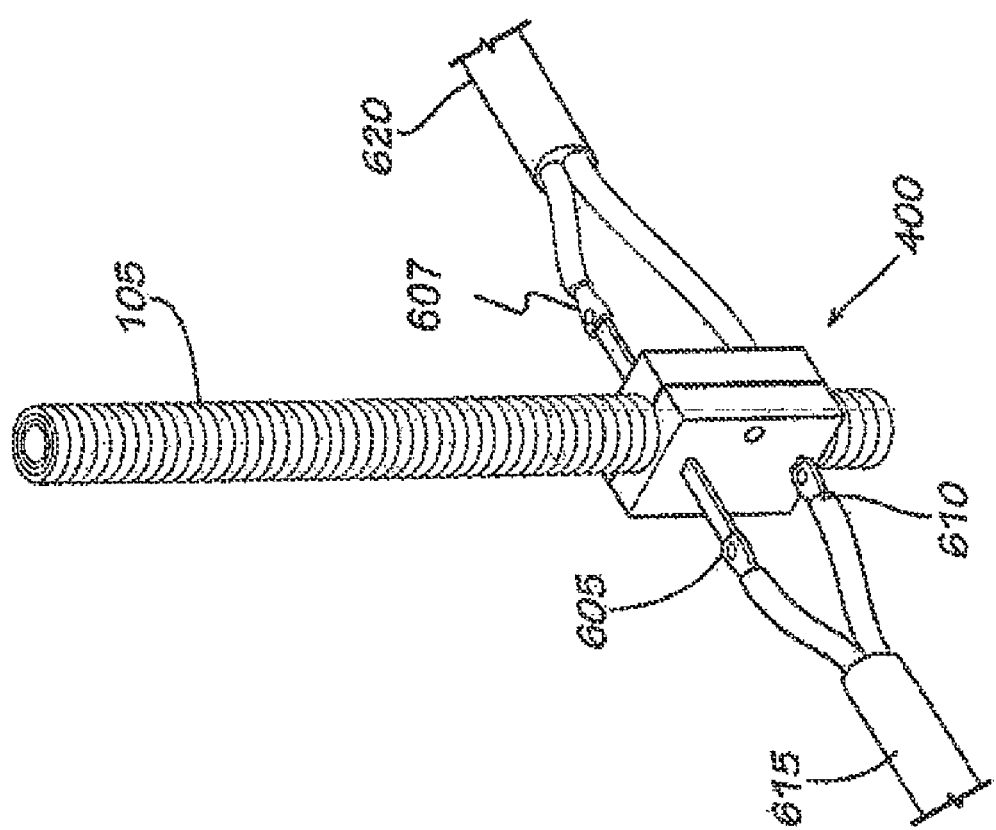

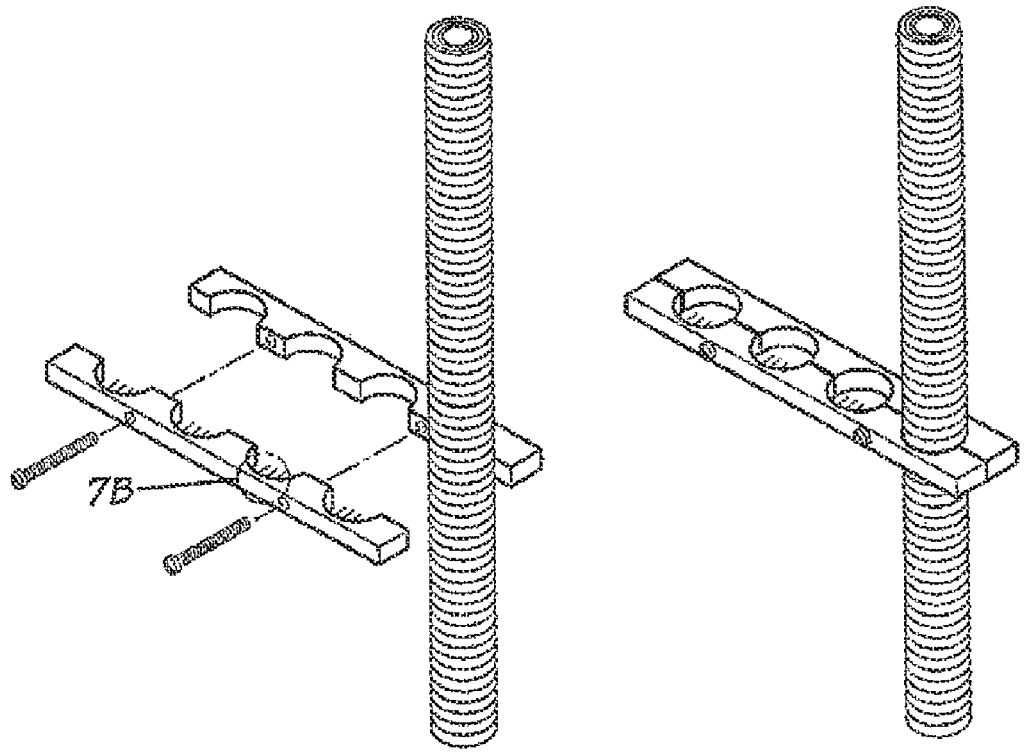
FIG. 7A  FIG. 7C
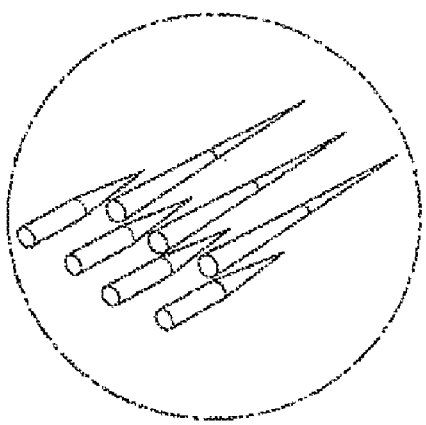
FIG. 7B

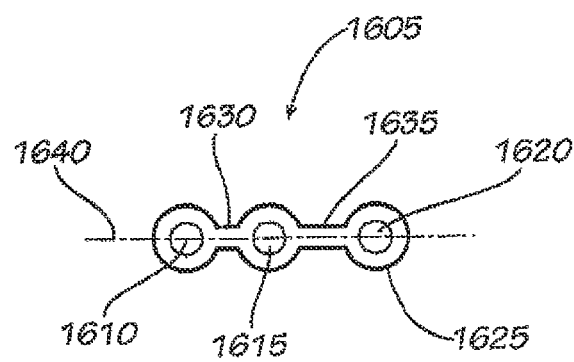
FIG. 16
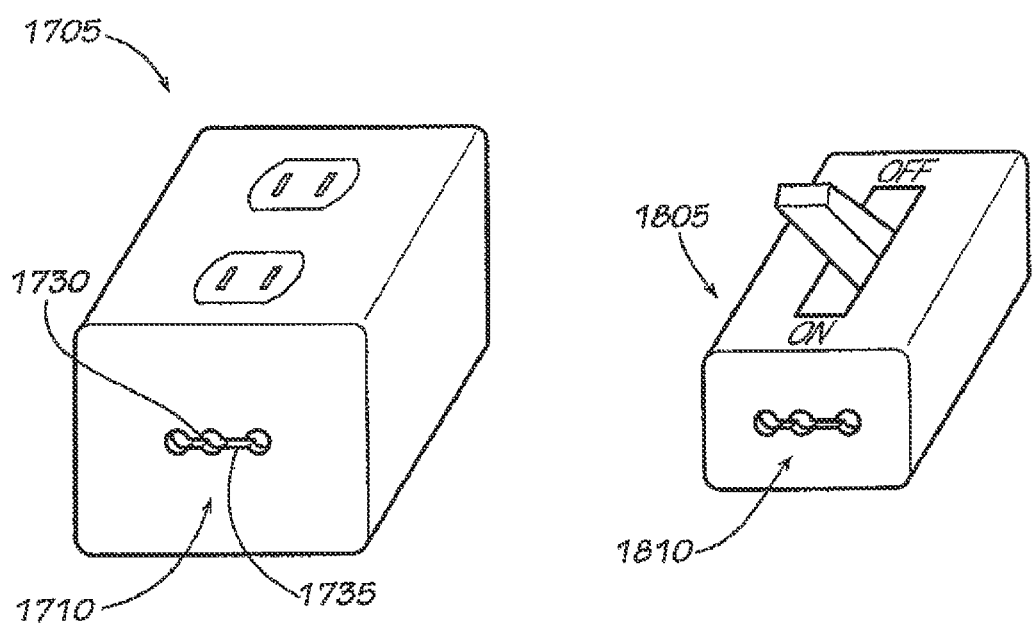
FIG. 17
FIG. 18

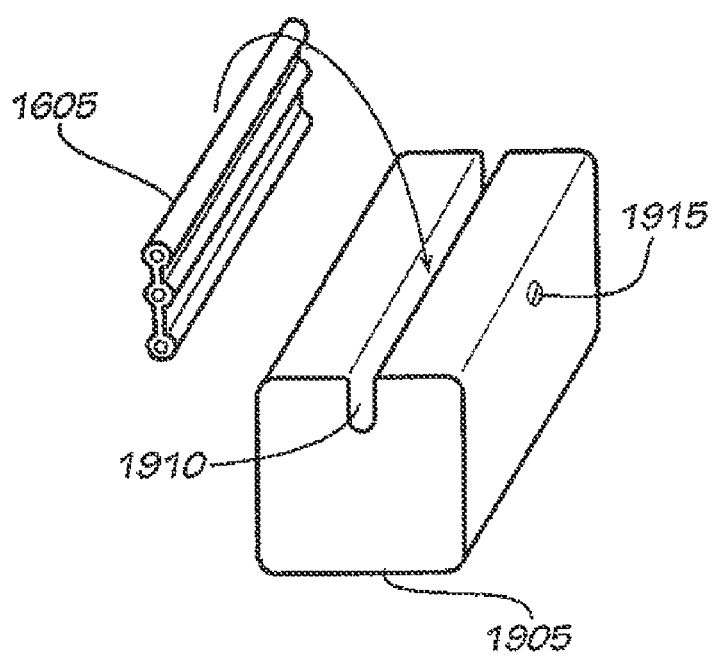
FIG. 19
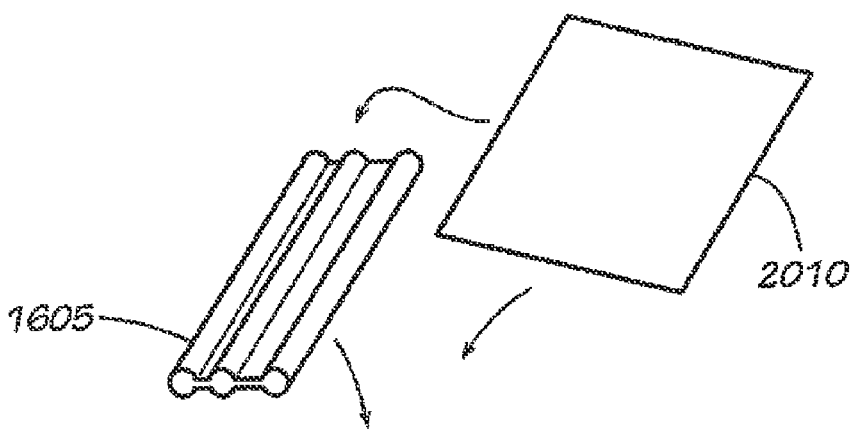
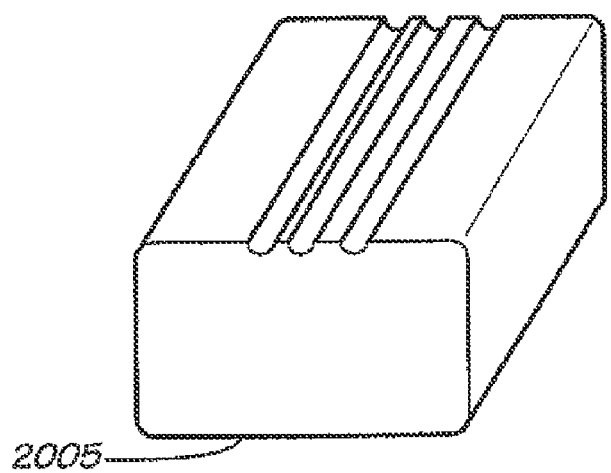
FIG. 20

PIERCING CONNECTOR FOR CONTINUOUS FLEXIBLE BUS

RELATED APPLICATION

This application is a Continuation of co-pending U.S. application Ser. No. 13/076,486 entitled "Piercing Connector for Continuous Flexible Bus" filed Mar. 31, 2011, which is a Continuation of Ser. No. 12/580,357 entitled "Piercing Connector for Continuous Flexible Bus" filed Oct. 16, 2009, which issued on Sep. 27, 2011 as U.S. Pat. No. 8,025,524, which claims the benefit under provisions of 35 U.S.C. §119 (e) of U.S. Provisional Application No. 61/106,249, filed Oct. 17, 2008, which are incorporated herein by reference.

COPYRIGHTS

All rights, including copyrights, in the material included herein are vested in and the property of the Applicants. The Applicants retain and reserve all rights in the material included herein, and grant permission to reproduce the material only in connection with reproduction of the granted patent and for no other purpose.

BACKGROUND

Conventional power distribution systems comprise: i) busway and stab; and ii) pipe and wire with boxes. The busway and stab system is fairly modular although the busway construction and installation is difficult and costly. The pipe and wire system requires difficult terminations and additional boxes for terminating onto a main trunkline. The pipe and wire system also requires substantial labor in fabricating conduit bends and preparing fittings.

Furthermore, when conventional devices such as receptacles, breakers, or switches, are installed, a power cable must be cut. The cable comprises a number of individual wires, some of which are insulated with color-coded insulation. Once the cable is cut, the individual wires comprising the cable must be stripped of the color-coded insulation for a small distance on the respective individual wires. After the insulation is stripped, the wires must each be bent into a curve on the tip ends and then hooked onto screws on the device. The screws must then be tightened onto the wires. Also, during this process, care must be given to the color-code on each wire to make sure the right color gets matched to the right screw. As can be seen, installing a device can be labor intensive and error prone if wiring color is crossed.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A continuous flexible bus may be provided. The continuous flexible bus may comprise a plurality of flexible conductors that may be metal clad. A device, such as a switch for example, may be connected to the continuous flexible bus. In order to connect the device to the continuous flexible bus, at least one piercing connector may be used. The at least one piercing connector may be configured to pierce one of the plurality of flexible metal clad conductors. Once the one of the plurality of flexible metal clad conductors is pierced, the at least one piercing connector may cause an electrical connection between an electrical conductor in the pierced one of the plurality of flexible metal clad conductors and the switch.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIGS. 3A and 3B show the tap box and switch panel from FIG. 2 in more detail;

FIGS. 4, 5, and 6 show connectors that tap into phase and grounding conductors;

FIGS. 7A, 7B, and 7C show a connector for a three-phase tap;

FIG. 16 shows a keyed power cable cross sectional view;

FIG. 17 shows a device that may be configured to a accept keyed power cable;

FIG. 18 shows a device that may be configured to a accept keyed power cable;

FIG. 19 shows a keyed power cable being placed in a trough;

FIG. 20 shows a device configured to receive a keyed power cable in a flat manner;

DETAILED DESCRIPTION

Figures 1A, 1B:
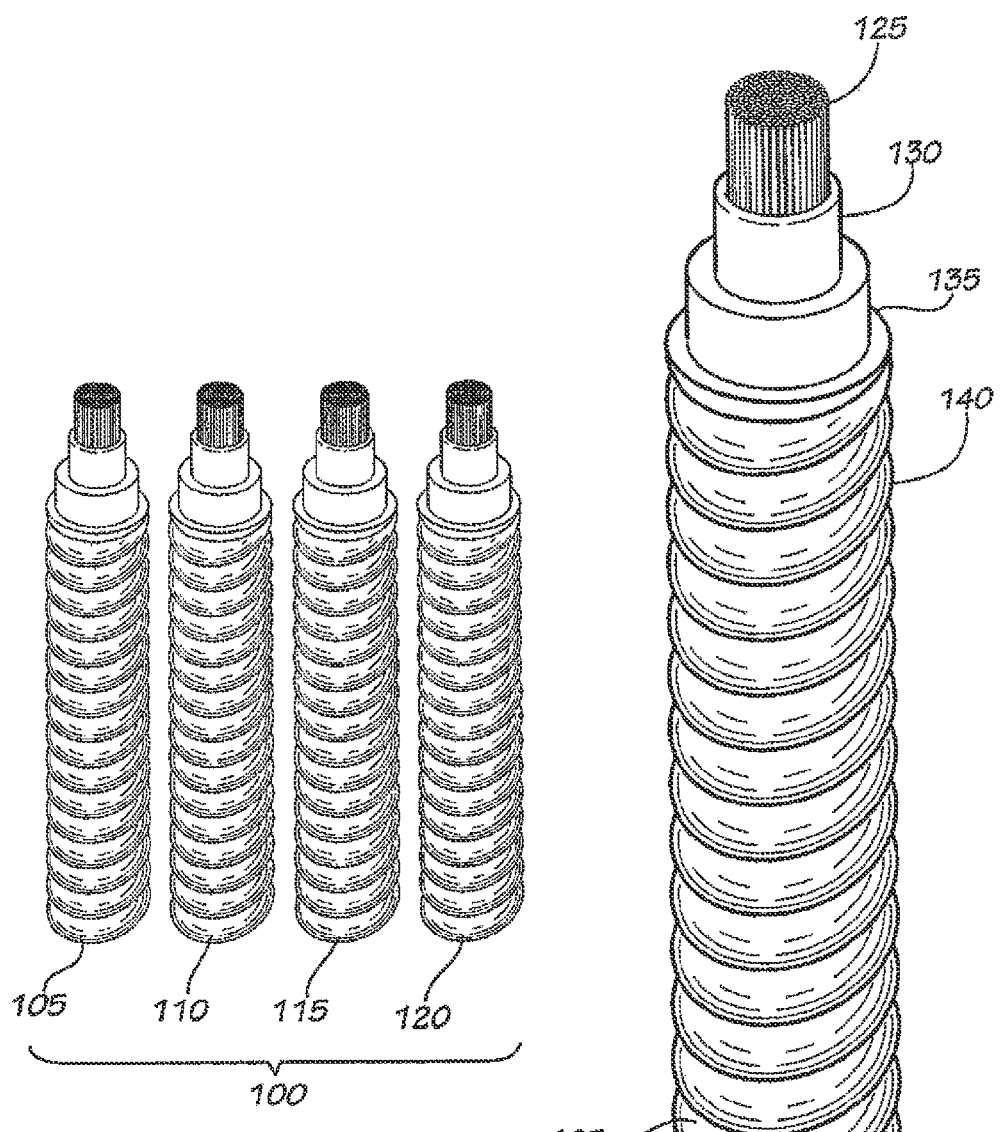
FIGS. 1A and 1B show metal clad conductors used in a continuous flexible bus.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Embodiments of the invention may save a contractor or an electrician time by providing a system to install power cables for commercial and industrial applications. Conventional electrical services are installed using bus bar busway systems or pipe and wire. With conventional busway systems, power can be tapped as demand increases by stabbing the bus with a disconnect stab. The drawbacks to the conventional busway system are installation complexity and cost associated with installation. When installing a conventional busway system, bus size and length must be carefully designed and ordered before installation. During installation, care must be given to erecting specific bus portions in certain locations indicated in the design. Embodiments of the invention provide a continuous flexible bus that may be installed with connectors that can tap into phase and grounding conductors. Because the continuous flexible bus may be pulled from a reel and cut to order on a job site, size and length need not be carefully designed and ordered before installation.

FIGS. 1A and 1B show metal clad conductors 105, 110, 115, and 120 that may be used in a continuous flexible bus 100. Within continuous flexible bus 100, one of metal clad conductors 105, 110, 115, and 120 may comprise a neutral while the remaining three may respectively correspond to the three phases of a three-phase power system. Cladding on conductors 105, 110, 115, and 120 may comprise an armor that may be made of non-metal materials and is not limited to metal materials. Metal clad conductor 105 may comprise a conductor 125, an insulation 130, a jacket 135, and an armor 140. Metal clad conductors 110, 115, and 120 may be made of similar construction to metal clad conductor 105. Armor 140 may comprise any substance (e.g. metallic, non-metallic, electrically conductive, electrically semi-conductive, etc.). For example, armor 140 may comprise a continuous strip having a width and being applied helically around jacket 135. The continuous strip, for example, may be snuggly or tightly wrapped around jacket 135. Armor 140 may be, but is not limited to, welded corrugations or other assembly construction such as interlocked strip or braided stranding for example.

Unlike conventional rigid bus systems, continuous flexible bus 100 may be flexible and can be placed and stored on a reel. Consequently, continuous flexible bus 100 may be more easily installed because it can be flexed and easily fed during installation making it easier to install over a rigid metal bus. Also, because flexible bus 100 may be placed and stored on a reel in long lengths after manufacture, individual rigid short bus lengths do not have to be managed. In other words, with conventional systems, conventional bus systems must be pre-engineered and made to order for a particular job. Consistent with embodiments of the invention, continuous flexible bus 100 may be paid-off a reel or reels on a job site and cut to order during installation.

Figure 2:
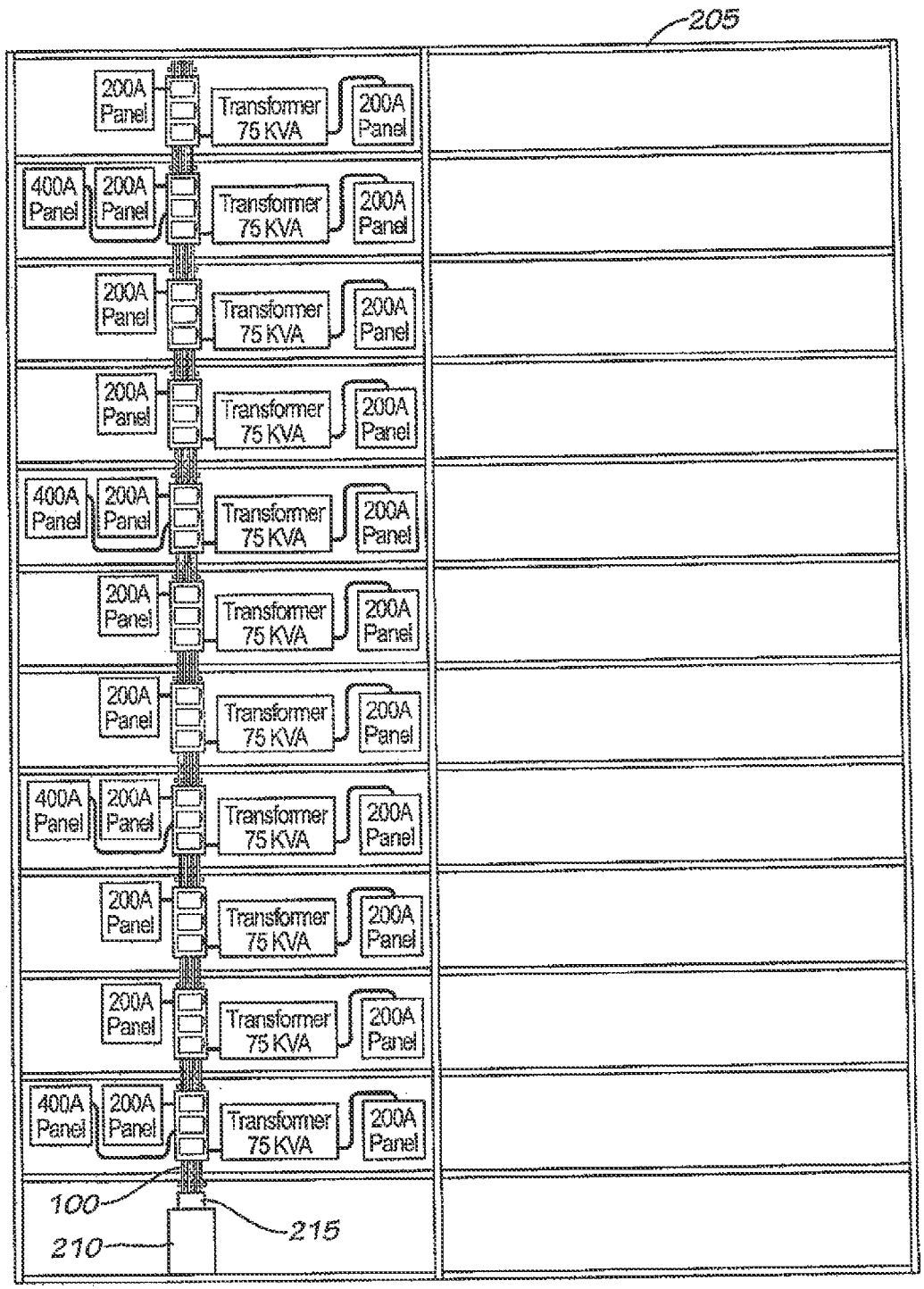
FIG. 2 shows a cut-a-way of a twelve story building including power distribution utilizing a continuous flexible bus.

FIG. 2 shows a cut-a-way of a multi-story building 205 including power distribution utilizing continuous flexible bus 100. Consistent with embodiments of the invention, continuous flexible bus 100 may be used in cable risers supplying power, for example, to multi-story building 205, such as offices, apartments, or condominiums. For example, continuous flexible bus 100 may be placed in a substantially vertical raceway in multi-story building 205. Power (e.g. three-phase power from an electric utility company) may enter building 205 and terminate in a switch panel 210. From switch panel 210, the power may feed a tap box 215 that taps metal clad conductors 105, 110, 115, and 120 of continuous flexible bus 100. Tap box 215 may tap metal clad conductors 105, 110, 115, and 120 using piercing connectors as described in greater detail below. In this way, power (e.g. three-phase power from an electric utility company) entering building 205, may be fed to continuous flexible bus 100. As described in greater detail below, continuous flexible bus 100 may be tapped and used to feed various electrical panels and transformers in building 205.

FIGS. 3A and 3B show the tap box and switch panel from FIG. 2 in more detail. Metal clad conductors 105, 110, 115, and 120 may be caped by caps 220 that are described in more detain below with respect to FIG. 10.

Figure 4:
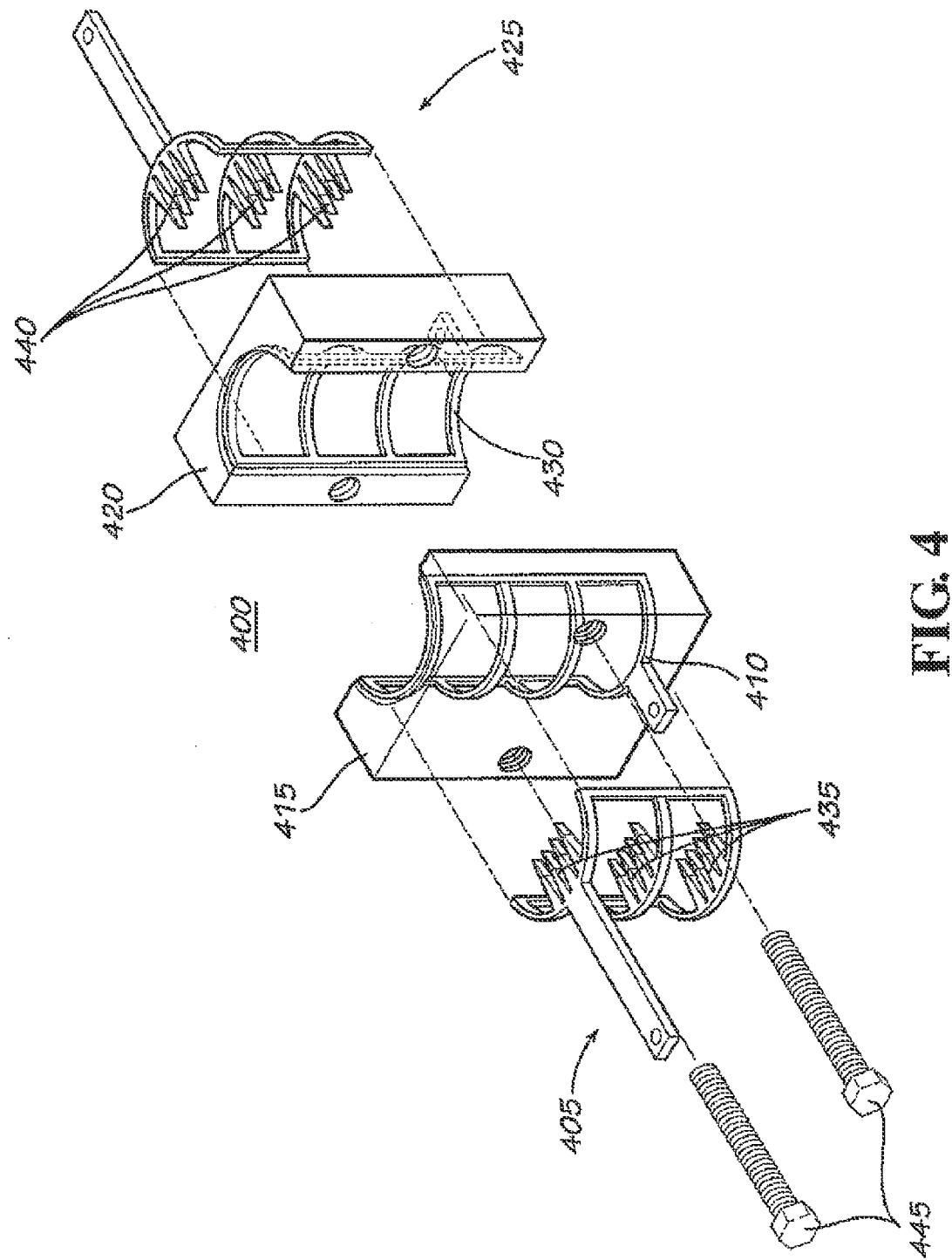
Figure 5:
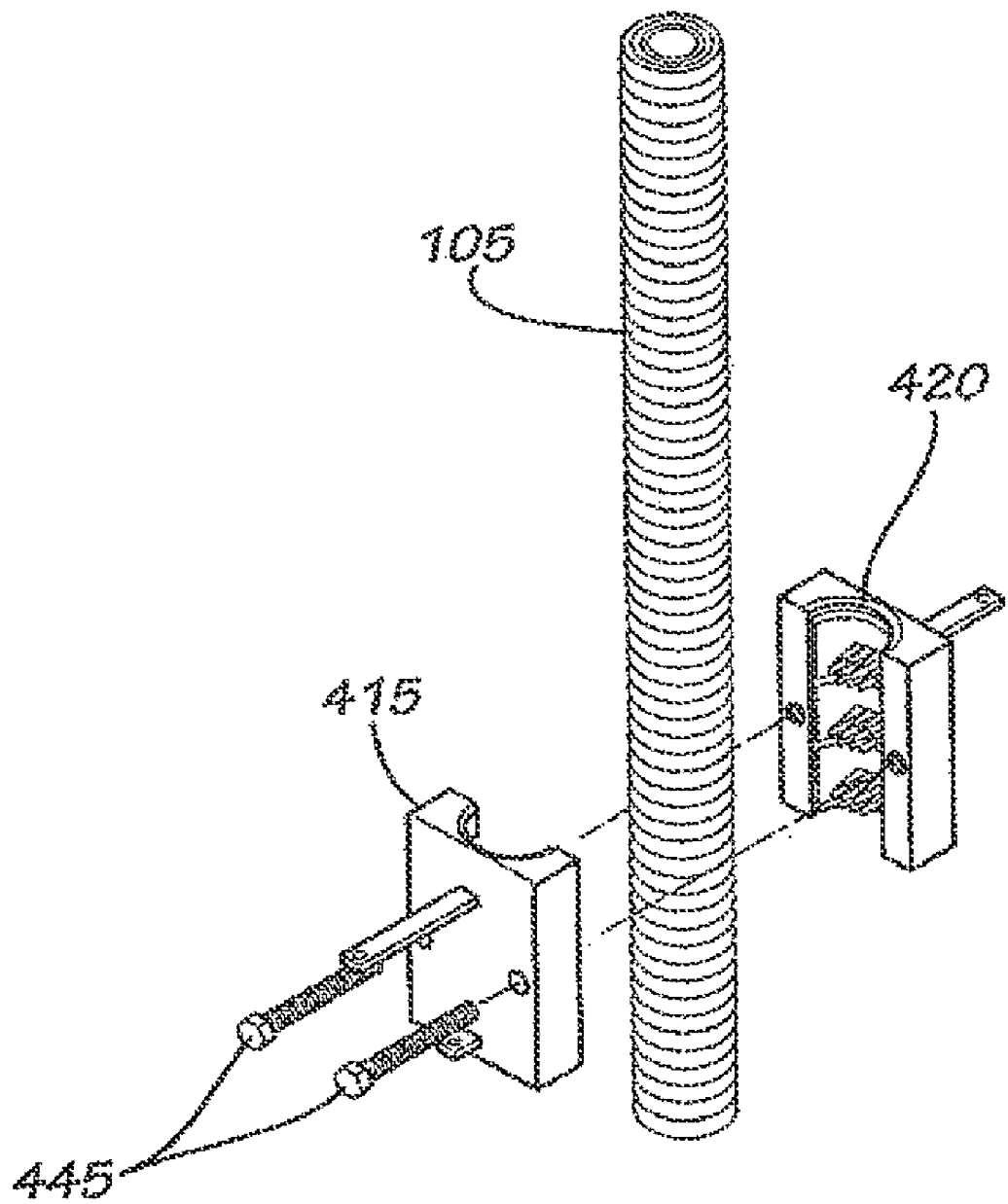

FIGS. 4, 5, and 6 show connectors that tap into continuous flexible bus 100. As shown in FIG. 4, a piercing connector 400 may include a first circuit conductor lug 405 and a first ground conductor lug 410 in a first block 415. A second block 420 may hold a second circuit conductor lug 425 and a second ground conductor lug 430. First circuit conductor lug 405 may include one or a plurality of first piercing contacts 435. Similarly, second circuit conductor lug 425 may include one or a plurality of second piercing contacts 440. Consistent with embodiments of the invention, any number of circuit conductor lugs or ground conductor lugs may be used with piercing connector 400.

As shown in FIG. 5, first block 415 and second block 420 may be fastened together around metal clad conductor 105. While FIG. 5 shows bolts 445 being used to fasten first block 415 and second block 420 together around metal clad conductor 105, any fastener may be used and embodiments of the invention are not limited to bolts as fasteners. As bolts 445 are tightened, metal clad conductor 105 may be pierced by piercing contacts (e.g. first piercing contacts 435 and/or second piercing contacts 440) that pierce armor 140, pass through jacket 135 and insulation 130, and may make and maintain electrical contact with conductor 125. Also, as bolts 445 are tightened, first ground conductor lug 410 and second ground conductor lug 430 may make contact and fit snuggly between armor 140 and first block 415 and second block 420 respectively. Accordingly, first ground conductor lug 410 and second ground conductor lug 430 may make and maintain electrical contact with armor 140. Bolts 445 may comprise "break off" torque bolts where the heads of bolts 445 snap off when proper torque (e.g. a predetermined amount) is achieved. The predetermined amount of torque may comprise enough torque to cause metal clad conductor 105 to be pierced by piercing contacts (e.g. first piercing contacts 435 and/or second piercing contacts 440) that pierce armor 140, pass through jacket 135 and insulation 130, and may make and maintain electrical contact with conductor 125.

FIG. 6 shows piercing connector 400 snuggly bolted around metal clad conductor 105. The piercing contacts (e.g. first piercing contacts 435 or second piercing contacts 440) may be connected to one or more tabs that are on an exterior of piercing connector 400. Similarly, first ground conductor lug 410 may be connected to one or more tabs that are on an exterior of piercing connector 400. For example, first piercing contacts 435 may be connected to a first tab 605 and first ground conductor lug 410 may be connected to ground tab 610. Second piercing contacts 440 may be connected to a second tab 607. As shown in FIG. 6, first tab 605 may then be connected to a conductor wire in a first cable 615 and ground tab 610 may then be connected to a ground wire in first cable 615. Second piercing contacts 440 and second ground conductor lug 430 may be similarly connected to a second cable 620.

Consistent with embodiments of the invention, first circuit conductor lug 405 and first ground conductor lug 410 may be maintained in piercing connector 400 in such a way that they do not come into electrical contact with each other. Also, second circuit conductor lug 425 and second ground conductor lug 430 may be maintained in piercing connector 400 in such a way that they do not come into electrical contact with each other as well. For example, first block 415 and second block 420 may be made of a non-conducting material (e.g. porcelain or epoxy). Or first circuit conductor lug 405 and second circuit conductor lug 425 may be insulated at all points where they touch their respective blocks.

Moreover, first piercing contacts 435 and second piercing contacts 440 may be insulated in areas where they may contact armor 140 when piercing connector 400's installation in complete as shown in FIG. 6. In other words, once piercing connector 400 is completely installed, first piercing contacts 435 and second piercing contacts 440 may only be making and maintaining electrical contact with conductor 125 and may not making and maintaining electrical contact with other parts of metal clad conductor 105. Consequently, as shown in FIGS. 4, 5, and 6, the connectors may be configured to tap one phase or neutral (e.g. one of metal clad conductors 105, 110, 115, and 120) or a three-phase configuration may be configured to tap all conductors in continuous flexible bus 100 (e.g. all metal clad conductors 105, 110, 115, and 120) as shown in FIGS. 7A, 7B, and 7C.

Figures 8A, 8B:
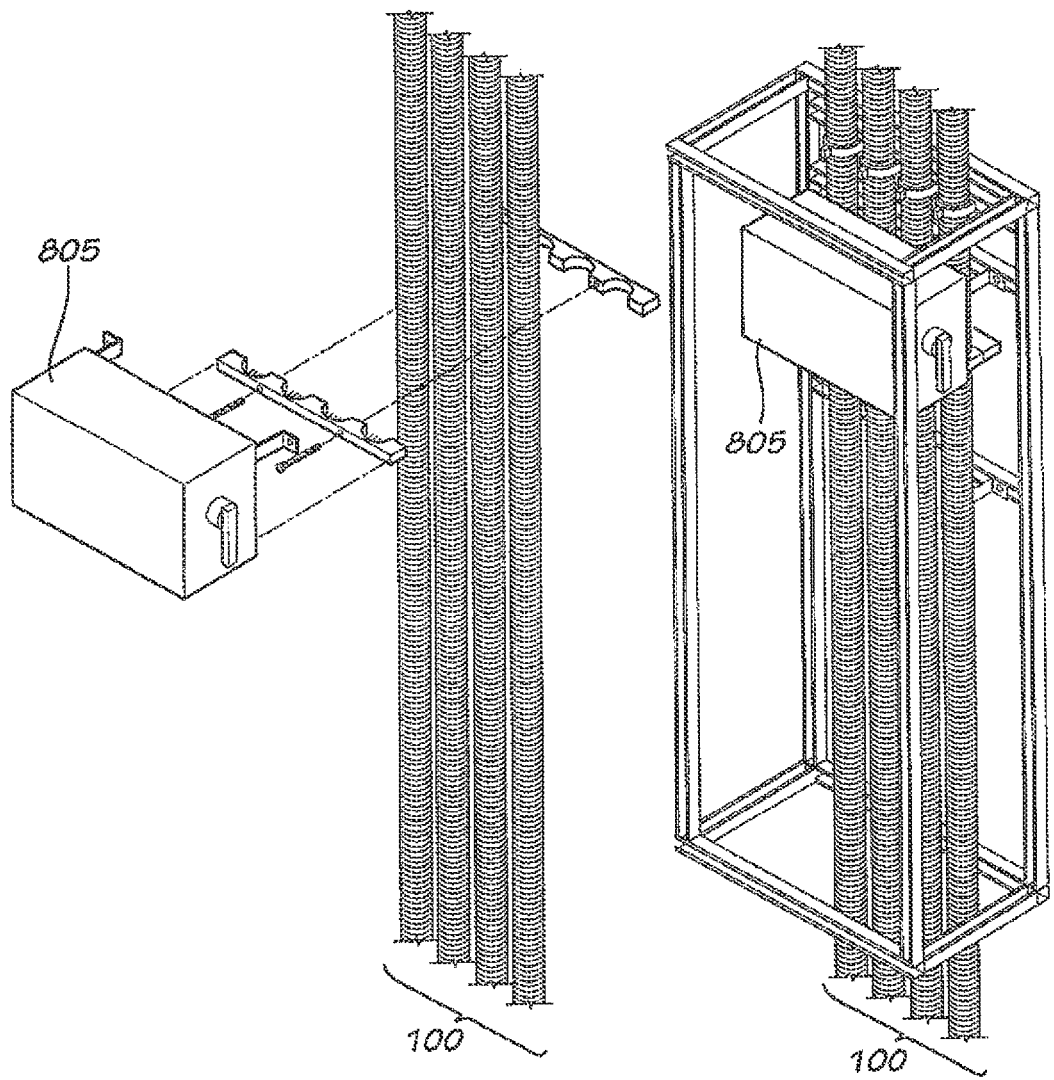
FIGS. 8A and 8B show a fused switch from FIG. 2 using the three-phase tap of FIG. 7 to tap the flexible continuous bus.
Figure 9:
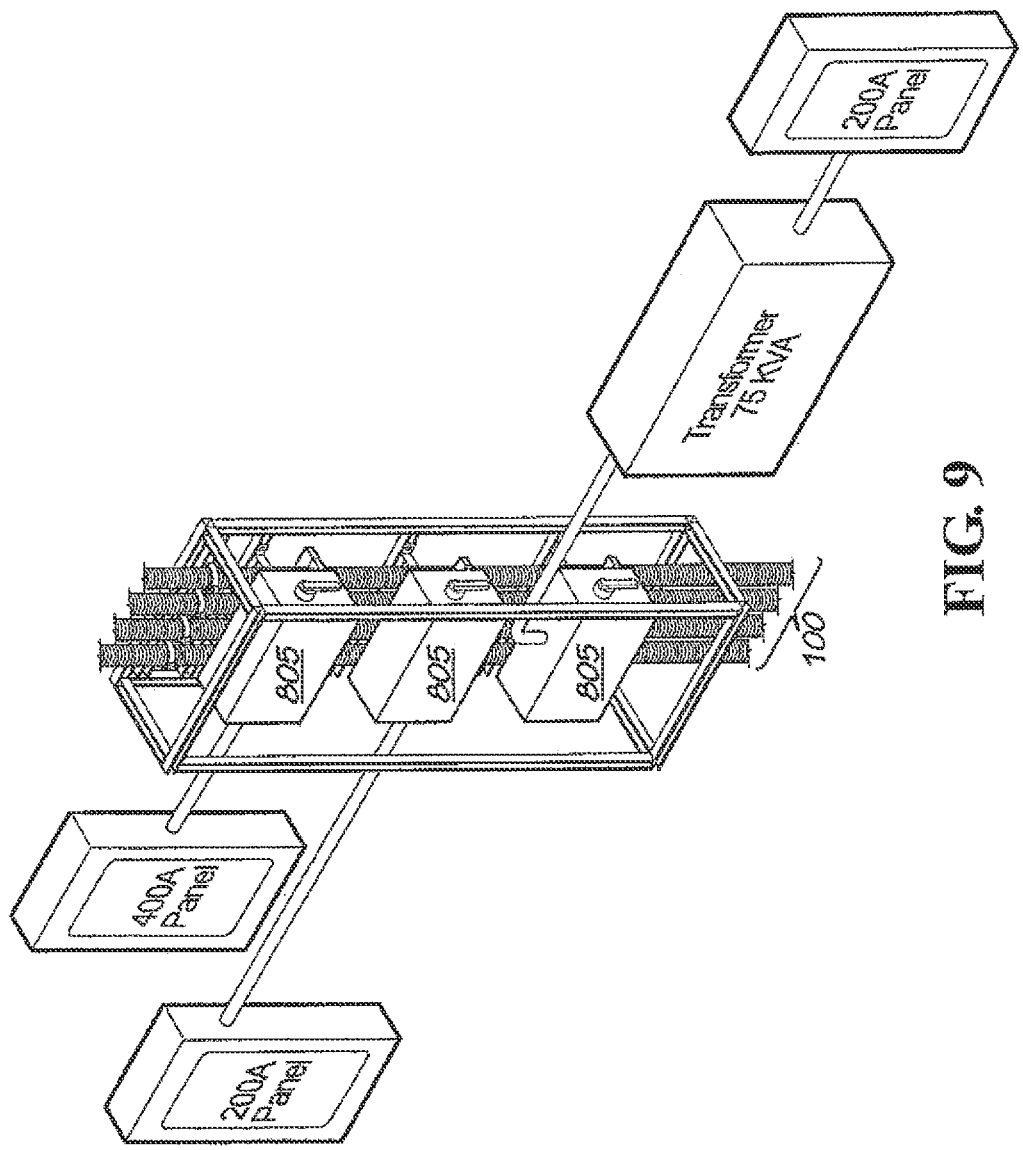
FIG. 9 shows a fused switch from FIG. 2, FIG. 8A, and FIG. 8B feeding various panels and a transformer.

FIGS. 8A and 8B show a fused switch 805 using the three-phase tap of FIGS. 7A, 7B, and 7C to tap flexible continuous bus 100. For example, fused switch 805 may use the connectors shown in FIGS. 4, 5, and 6 to tap into continuous flexible bus 100. As stated above, continuous flexible bus 100 may be electrically energized from switch panel 210. In order to get power from continuous flexible bus 100 fed to loads on a floor of building 205, fused switch 805 may be used to tap flexible continuous bus 100. FIG. 9 shows switches similar to fused switch 805 from FIG. 2, FIG. 8A, and FIG. 8B feeding various panels and a transformer on a floor of building 205. As shown in FIG. 2, a configuration similar to that of FIG. 9 may be used on any or all floors of building 205 to tap into continuous flexible bus 100.

Figure 10:
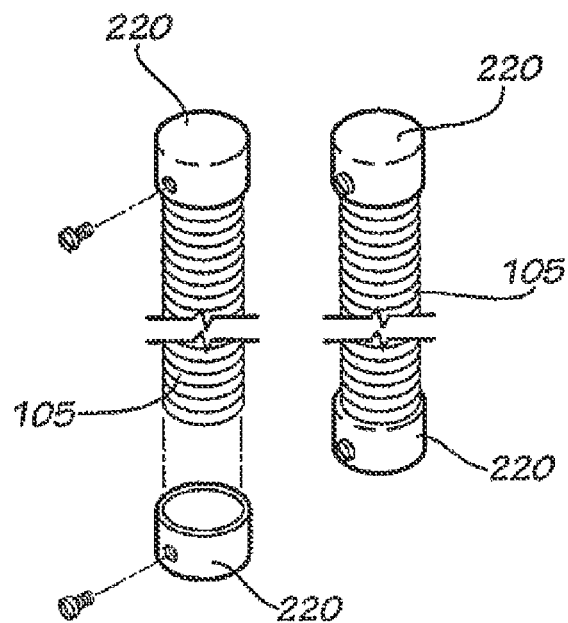
FIG. 10 shows end caps for metal clad conductors used in the continuous flexible bus.
Figure 11:
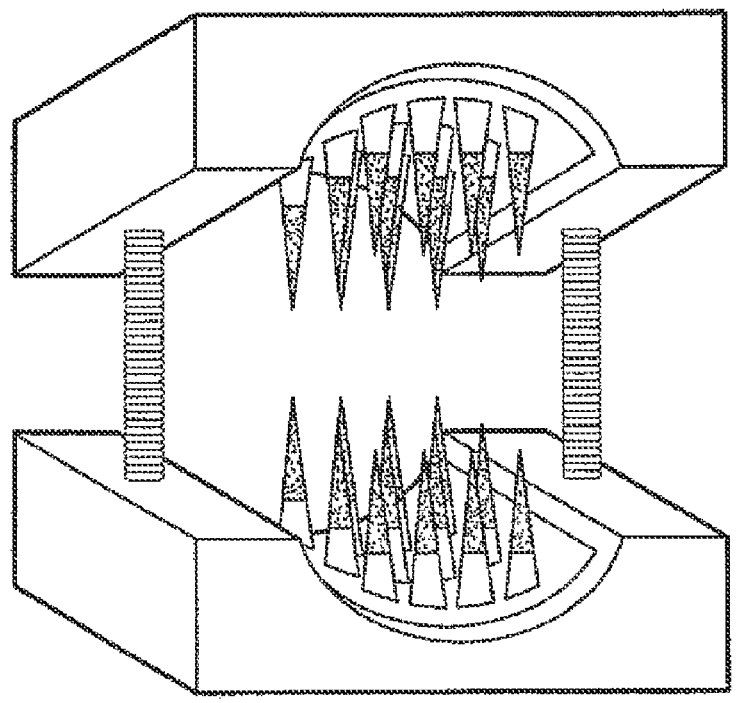
FIGS. 11 and 12 show armor and insulation piercing contacts for phase and grounding conductors.
Figure 12:
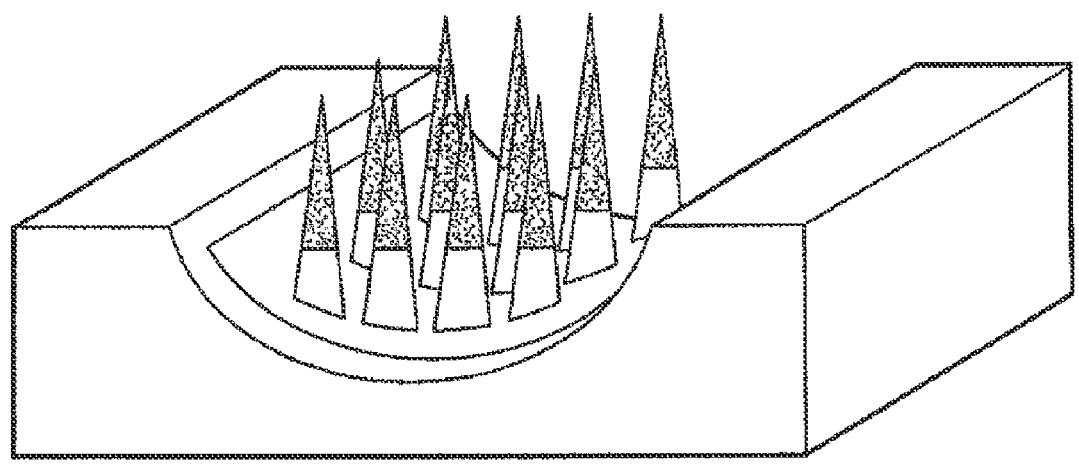

FIG. 10 shows end caps 220 from FIGS. 3A and 3B for metal clad conductors 105, 110, 115, and 120 used in continuous flexible bus 100. End caps 220 may be deployed at either or both ends of any one or more of metal clad conductors 105, 110, 115, and 120. FIGS. 11 and 12 show in more detail armor and insulation piercing contacts for metal clad conductors 105, 110, 115, and 120 as described above with respect to FIGS. 4, 5, and 6.

Figure 13:
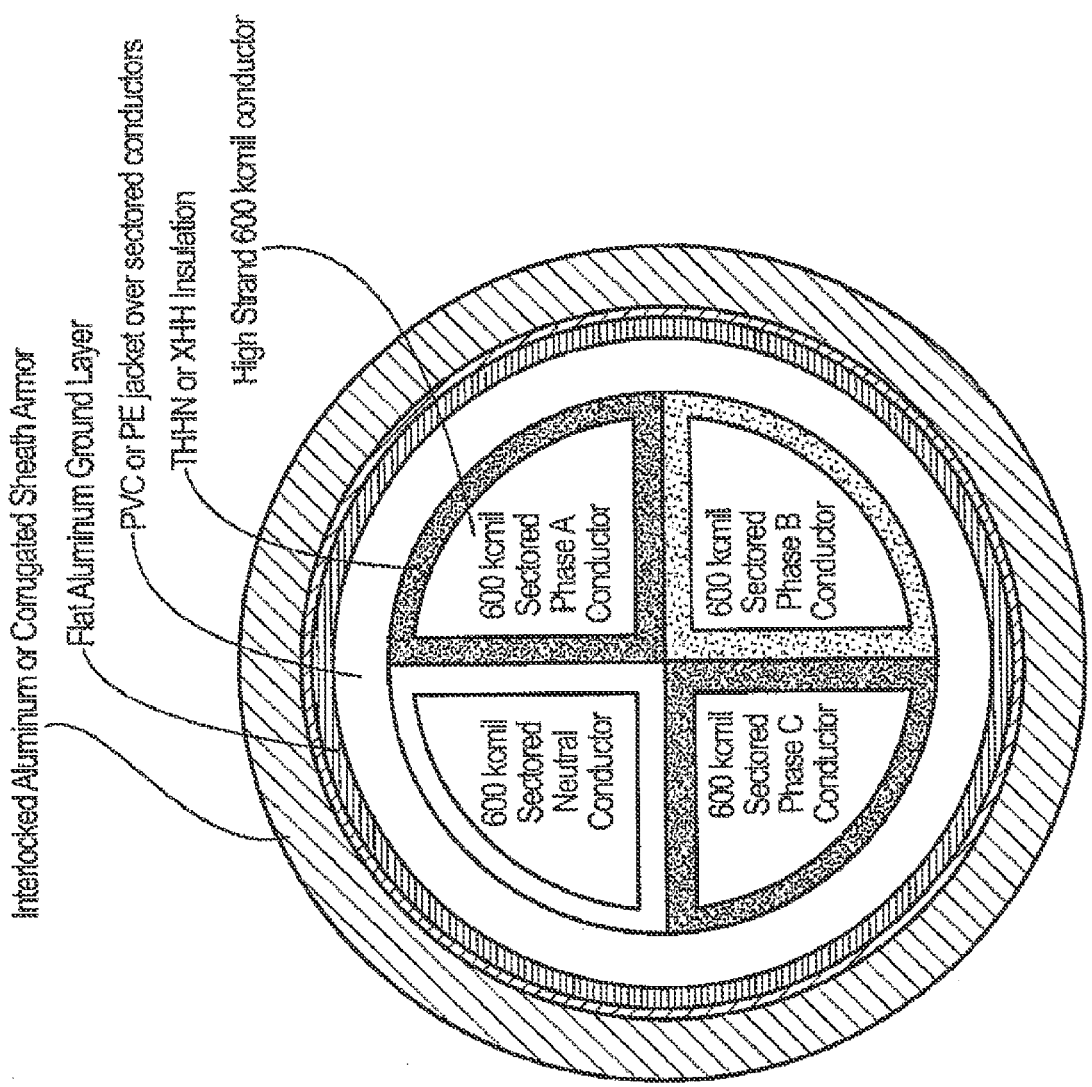
FIG. 13 shows metal clad conductors used in a continuous flexible bus in which three phases are contained within one metal cladding in a circular orientation.

FIG. 13 shows metal clad conductors used in a continuous flexible bus in which three phases are contained within one metal cladding in a circular orientation. In this configuration, one circular medal clad element may be used rather than four as illustrated in FIGS. 1A, 1B, and 2. In other words, in this configuration, all three phases and a neutral may be placed in one metal cladding and used as a continuous flexible bus. Notwithstanding, any number of phase and neutral conductors may be used. In this configuration, the continuous flexible bus of FIG. 13 may be pierced or taped at certain places on the exterior of the continuous flexible bus in order to tap a particular respective phase or neutral conductor. Accordingly, the exterior of the continuous flexible bus of FIG. 13 may be labeled or keyed in a manner that indicates where to pierce the continuous flexible bus in order to tap a particular respective phase or neutral conductor.

Figure 14:
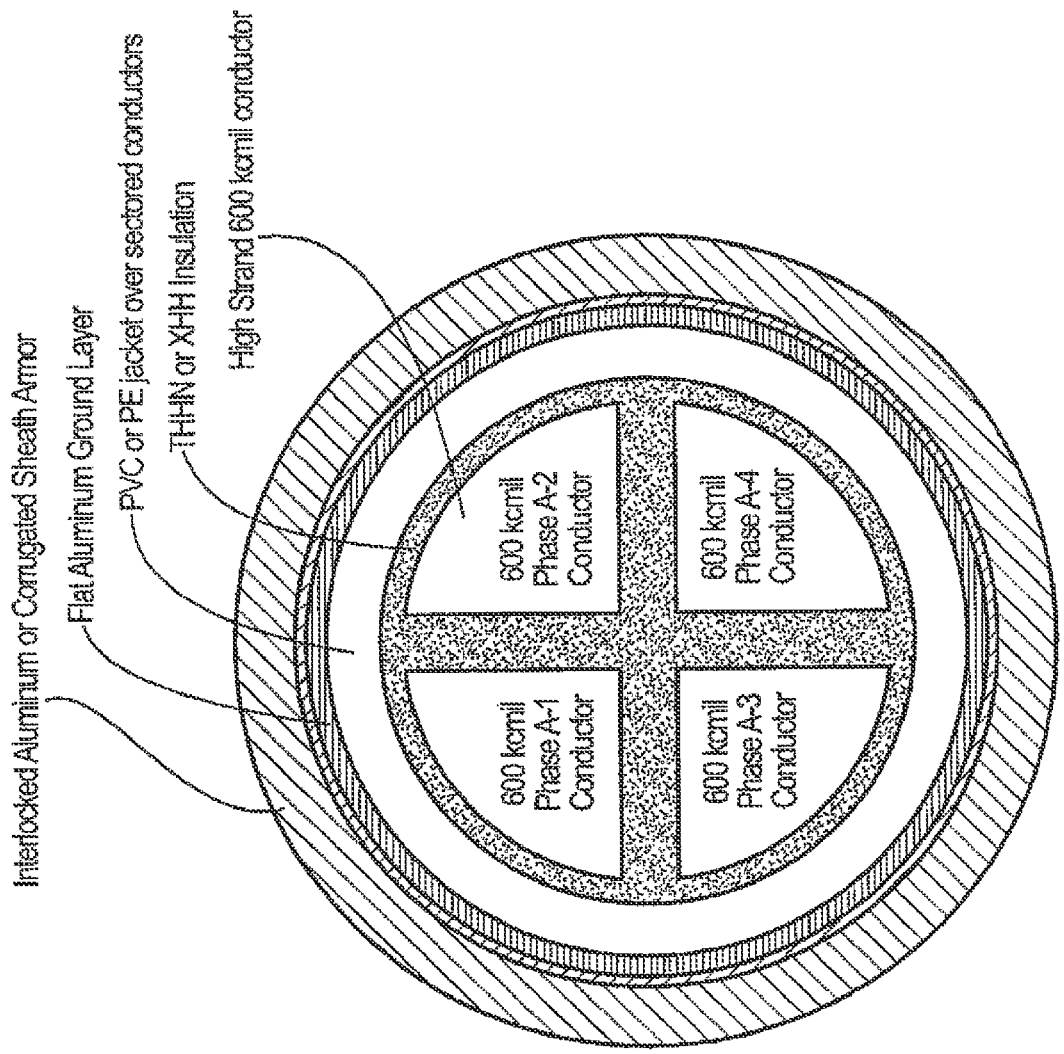
FIG. 14 shows metal clad conductors used in a continuous flexible bus in which four separate conductors associated with one phase are contained within one metal cladding in a circular orientation.

FIG. 14 shows metal clad conductors used in a continuous flexible bus. In this configuration, four separate conductors (e.g. sub-conductors) associated with one phase (or neutral) may be contained within one metal cladding in a circular orientation. In this configuration, the continuous flexible bus of FIG. 14 may be pierced or taped at certain places on the exterior of the continuous flexible bus of FIG. 14 in order to tap a particular respective sub-conductor. Accordingly, the exterior of the continuous flexible bus of FIG. 14 may be labeled or keyed in a manner that indicates where to pierce the continuous flexible bus in order to tap a particular respective sub-conductor.

Figure 15:
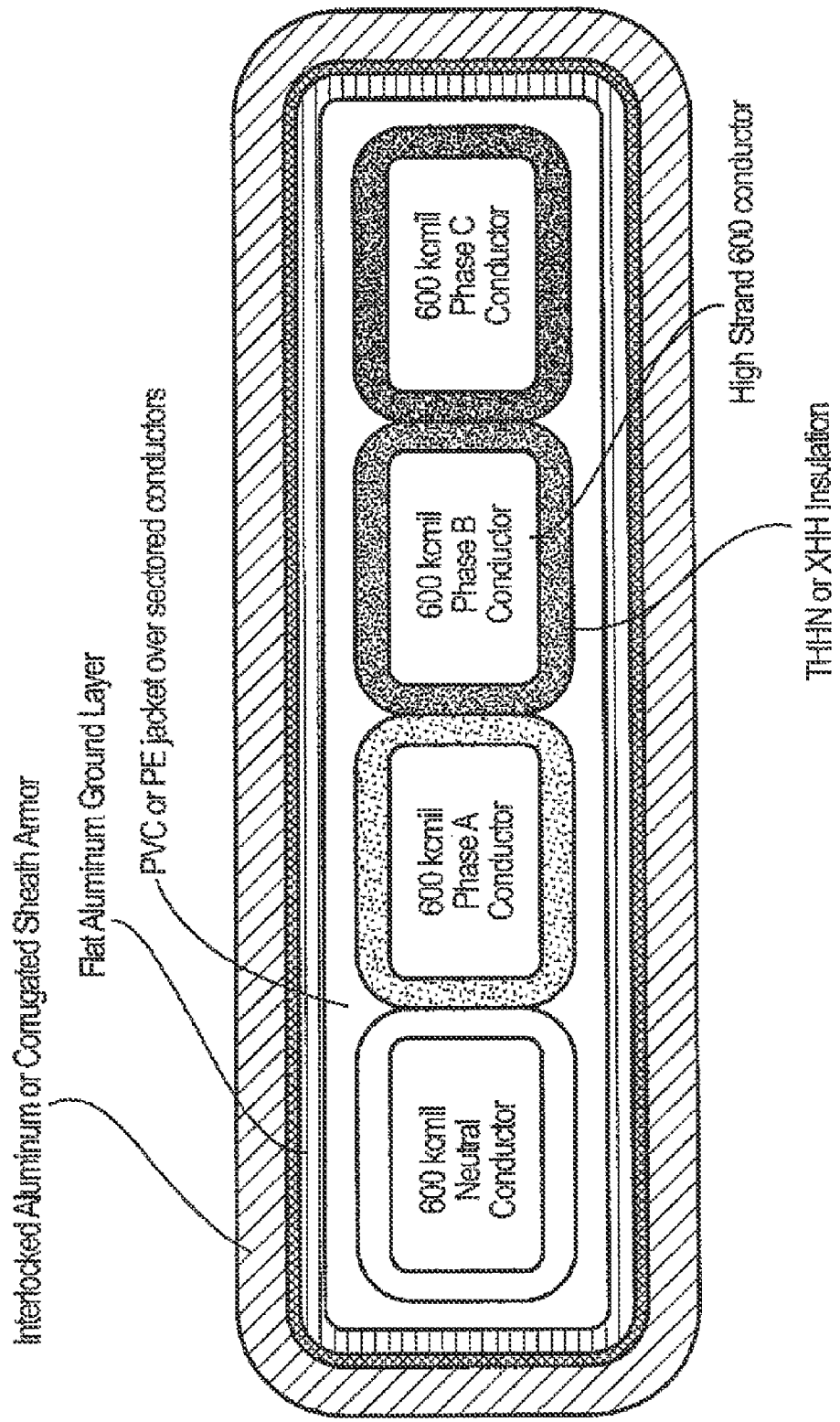
FIG. 15 shows metal clad conductors used in a continuous flexible bus in which three phases are contained within one metal cladding in a rectangular orientation.

FIG. 15 shows metal clad conductors used in a continuous flexible bus in which three phases are contained within one metal cladding in a rectangular orientation. The configuration of FIG. 15 is similar to that of FIG. 13; however, FIG. 15 is in a rectangular orientation. Like the FIG. 13 configuration, the continuous flexible bus of FIG. 15 may be pierced or taped at certain places on the exterior of the continuous flexible bus in order to tap a particular respective phase or neutral conductor. Accordingly, the exterior of the continuous flexible bus of FIG. 15 may also be labeled or keyed in a manner that indicates where to pierce the continuous flexible bus in order to tap a particular respective phase or neutral conductors.

Once power is fed from continuous flexible bus 100 to any one or more of the panels shown in FIG. 2, power may be fed from the panels to loads on any one or more of the floors in building 205. The power may be fed from the panels to loads using a keyed power cable. Consistent with embodiments of the invention, devices attached to the keyed power cable may be configured to easily attach and connect to the keyed power cable. The devices attached to the keyed power cable may be configured to control or tap power off of the keyed power cable. Such devices may comprise, but are not limited to, switches, breakers, receptacles, lighting fixtures, appliances, etc.

The devices may be configured to pierce and electrically connect to the keyed power cable in a predetermined manner. For example, the devices may be configured to accept the keyed power cable in only one way due to a "keyed" configuration of the keyed power cable. Because the device may receive the keyed power cable in only one way, the location of certain one or more conductors within the keyed power cable may match with certain piercing elements within a particular device. In this way, devices may be designed to match the keyed power cable and make piercing electrical connections with the keyed power cable so as to connect to the keyed power cable in a manner specifically needed for a given device.

FIG. 16 shows a keyed power cable 1605 cross sectional view. Keyed power cable 1605 may include a first conductor 1610, a second conductor 1615, a third conductor 1620, and an insulation layer 1625. A first distance 1630 may be different than a second distance 1635. In this way keyed power cable 1605 may be "keyed" by giving the conductors (first conductor 1610, second conductor 1615, and third conductor 1620) within keyed power cable 1605 certain predetermined positions. FIG. 16 shows one example of a "keyed" configuration and other configurations may be used to give conductors predetermined positions within a power cable. For example, keyed power cable 1605 may have a cross sectional symmetrical about only one axis, for example, an axis 1640. Furthermore, keyed power cables, consistent with embodiments of the invention, may have no cross sectional symmetrical.

Continuing the example of FIG. 16, FIG. 17 shows a device 1705 that may be configured to accept keyed power cable 1605 in one way. As shown in FIG. 17, device 1705 may include at least one "keyhole" 1710. Keyhole 1710 may include a distance 1730 configured to correspond to distance 1630 of keyed power cable 1605. In addition, keyhole 1710 may include a distance 1735 configured to correspond to distance 1635 of keyed power cable 1605. In this way, device 1705 may be configured to accept keyed power cable 1605 in one way. Device 1705 may include other keyholes similar to keyhole 1710 so that device 1705 may accept more that one keyed power cable.

FIG. 18 shows another device, for example, a breaker 1805 configured to fit into one of the panels of FIG. 2. As shown in FIG. 18 breaker 1805 may include a keyhole 1810 similar to keyhole 1710 of device 1705. After breaker 1805 is placed in the panel, a first end of keyed power cable 1605 may be placed in keyhole 1810. A bolt or screw on breaker 1805 may then be turned to cause a connector in breaker 1805 to pierce keyed power cable 1605 and make respective corresponding electrical connections with first conductor 1610, second conductor 1615, and third conductor 1620. A first of the corresponding electrical connections (e.g. to first conductor 1610) may be to a hot leg in the panel, a second of the corresponding electrical connections (e.g. to second conductor 1615) may be to a neutral in the panel, and a third of the corresponding electrical connections (e.g. to third conductor 1620) may be to a ground in the panel.

Device 1705 may then receive a second end of keyed power cable 1605 in keyhole 1710. A bolt or screw on device 1705 may then be turned to cause a connector in device 1705 to pierce keyed power cable 1605 and make respective corresponding electrical connections with first conductor 1610, second conductor 1615, and third conductor 1620. A first of the corresponding electrical connections (e.g. to first conductor 1610) may be to a hot side of a receptacle, a second of the corresponding electrical connections (e.g. to second conductor 1615) may be to a neutral side of the receptacle, and a third of the corresponding electrical connections (e.g. to third conductor 1620) may be to a ground post of the receptacle. Because device 1705 and breaker 1805 may be designed to match keyed power cable 1605 in only one way and make piercing electrical connections with keyed power cable 1605 so as to connect to keyed power cable 1605 in a manner needed, proper electrical connections are made. In other words, no wire striping or attention to proper color coded wires is needed. Consequently, the connections may be made faster and without introducing human error of crossing connections.

Devices consistent with embodiments of the invention may be configured to include a trough rather than a keyhole. As shown in FIG. 19, keyed power cable 1605 may be placed in a trough 1910. A screw 1915 on a device 1905 may then be turned to cause a connector in device 1905 to pierce keyed power cable 1605 and make respective corresponding electrical connections with first conductor 1610, second conductor 1615, and third conductor 1620. When device 1905 comprises a receptacle, a first of the corresponding electrical connections (e.g. to first conductor 1610) may be to a hot side of a receptacle, a second of the corresponding electrical connections (e.g. to second conductor 1615) may be to a neutral side of the receptacle, and a third of the corresponding electrical connections (e.g. to third conductor 1620) may be to a ground post of the receptacle. A similar trough configuration may be used with a breaker or any electrical device.

The aforementioned trough may be configured to accept keyed power cable 1605 in only one way. Because the aforementioned trough may be designed to match keyed power cable 1605 in only one way and make piercing electrical connections with keyed power cable 1605 so as to connect to keyed power cable 1605 in a manner needed, proper electrical connections are made. In other words, no wire striping or attention to proper color coded wires is needed. Consequently, the connections may be made faster and without introducing human error of crossing connections. Furthermore, with the trough configuration, keyed power cable 1605 need not be cut in order to connect a device. Rather devices may be connected to keyed power cable 1605 in line by, for example, clamping the device onto keyed power cable 1605.

Consistent with embodiments of the invention, as shown in FIG. 20, a device 2005 may be configured to receive keyed power cable 1605 in only one way in a flat manner. Then a plate 2010 may be placed over device 2005. Once plate 2010 is in place, keyed power cable 1605 may be pierced and connected in a manner similar to that described above with respect to FIG. 19.

Figure 21:
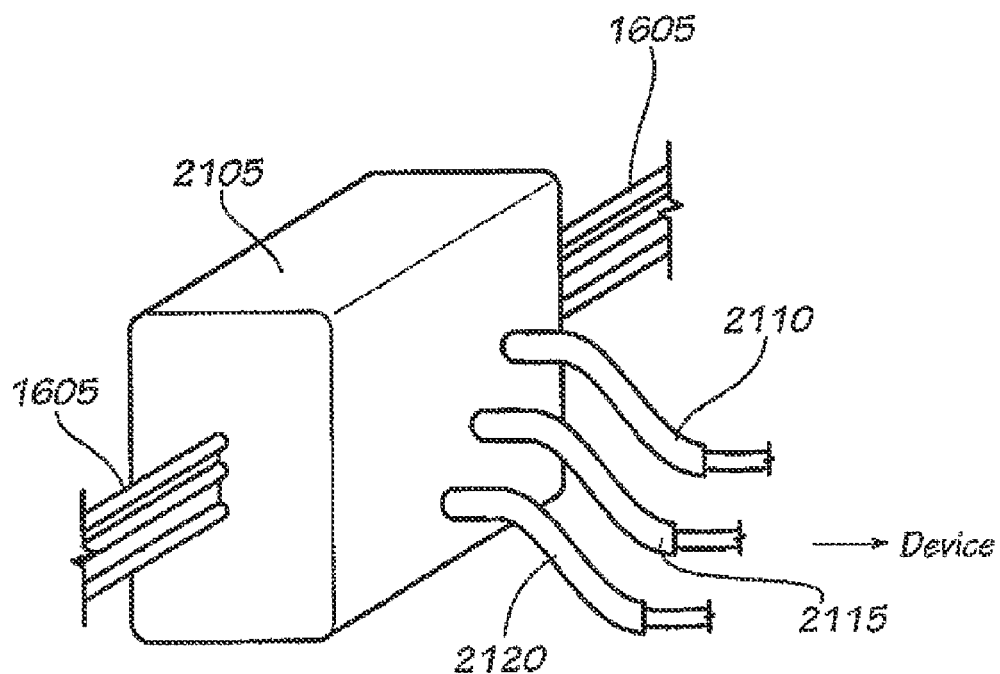
FIG. 21 shows a pigtail used to connect a keyed power cable to a device.
Figure 22:
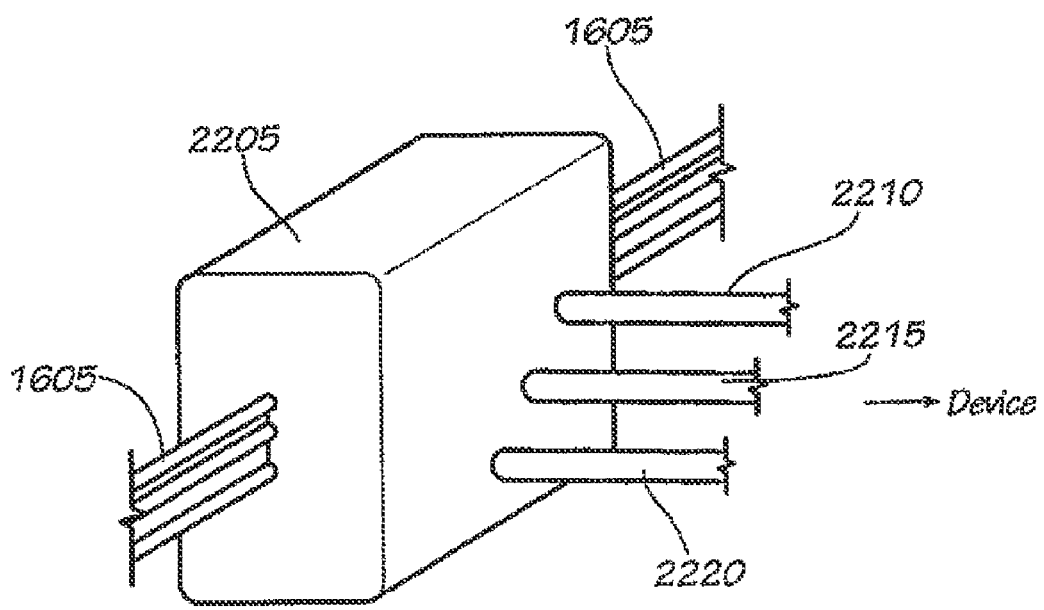
FIG. 22 shows a plug tail used to connect a keyed power cable to a device.

Furthermore, as shown in FIG. 21 and FIG. 22, consistent with embodiments of the invention, a pigtail 2105 or a plug tail 2205 may be used to connect keyed power cable 1605 to a device. Keyed power cable 1605 may interface with pigtail 2105 or plug tail 2205 in any manner described above including the keyhole manner, the trough manner, the flat manner, or any manner by which pigtail 2105 or plug tail 2205 can accept keyed power cable 1605 in only one way in order to pierce and connect to pigtail 2105 or plug tail 2205 in a consistent and predictable manner. For example, because pigtail 2105 may be configured to accept keyed power cable 1605 in only one way, conductor 1610 may always map to a black insulated conductor 2110, conductor 1615 may always map to a white insulated conductor 2115, and conductor 1620 may always map to a green insulated or bare conductor 2120. Furthermore, because plug tail 2205 may be configured to accept keyed power cable 1605 in only one way, conductor 1610 may always map to a first prong 2210, conductor 1615 may always map to a second prong 2215, and conductor 1620 may always map to a third prong 2220. The wires coming out of pigtail 2105 or the prongs coming out of plug tail 2205 may then connect to a device. While prongs are shown coming from plug tail 2205, pads, connectors, or any type of contacts may be used to connect plug tail 2205 to the receptacle in only one manner.

Consistent with embodiments of the invention, a keyed power cable may be configured to include conductors corresponding to at least both "hot legs" (e.g. left leg and right leg) of a 240 volt service. Devices may be configured to connect to such a keyed power cable in at least the manners described above (e.g. keyhole, trough, flat, etc.). Devices configured to connect to this type of keyed power cable may be configured to be "left leg" devices or "right leg" devices. In other words, a "left leg" device may be configured to connect to the hot conductor in keyed power cable corresponding to the "left leg." Similarly, a "right leg" device may be configured to connect to the hot conductor in keyed power cable corresponding to the "right leg." In this way, a substantially equal number of "left leg" and "right leg" devices may be used in a given installation in order to balance the load between both legs.

Devices may also include devices that may use video or data services. In this case, the keyed power cable may also include a data and/or a video conductor. Such devices may be pierced and connected to in any of the manners described above. The data and/or a video conductor may occupy a particular location in the keyed power cable. Devices that may use video or data services may be configured to pierce and connect to this particular location. For example, a device may comprise, but not limited to, an RJ-45 data port. Consequently, this device may be configured to pierce and connect to the data conductor and not pierce and connect to any power conductors. Furthermore, a device may comprise a camera. Consequently, this device my may be configured to pierce and connect to both the data conductor and to the power conductors in the keyed power cable.

Furthermore, the device may comprise or include an electronic switch. In this example, the device may be configured to pierce and connect to the data conductor and to the power conductors in the keyed power cable. The electronic switch may be an addressable device on a data network that is operating on the data conductor. A controller computer may operate on the data network and operate the electronic switch. Or the controller computer may program the switch to operate any device on the data network. For example, one device may comprise a receptacle having an electronic switch and another device may comprise an electronic "flip" type switch that may be mounted on a wall. Both of these devices may be connected to the data network controlled by the computer. In other words, the electronic "flip" type switch may pierce and connect to the data conductor in the keyed power cable and the receptacle may pierce and connect to both the power and the data in the keyed power cable. Consequently, the computer may be programmed to monitor the state of the "flip" switch using the data network. When the computer detects a state change, the computer may change a state of the switch in the receptacle. In this way, flipping the switch may turn power to the receptacle on and off. Latter, the computer may be reprogrammed to allow the "flip" type switch to operate some other device on the data network under the computer's control.

While certain embodiments of the invention have been described, other embodiments may exist. Further, the disclosed methods' stages may be modified in any manner, including by reordering stages and/or inserting or deleting stages, without departing from the invention. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A continuous flexible bus comprising:
    a plurality of flexible clad conductors;
    at least one piercing connector having a plurality of piercing contacts and configured to pierce one of the plurality of flexible clad conductors and to cause an electrical connection between an electrical conductor in the pierced one of the plurality of flexible clad conductors and a switch,
    wherein the plurality of piercing contacts are insulated to only establish electrical contact with the electrical conductor and not with an armor surrounding the electrical conductor.

2. The continuous flexible bus of claim 1, wherein the piercing connector comprises:
    a first block associated with at least a first circuit conductor lug having the plurality of piercing contacts;
    a second block; and
    at least one fastener connecting the first block to the second block, the at least one fastener configured to cause the plurality of piercing contacts to make and maintain electrical contact with the electrical conductor placed between the first block and the second block.

3. A piercing connector comprising:
    a first block associated with a first circuit conductor lug having a plurality of first piercing contacts;
    a second block; and
    bolts connecting the first block to the second block, the bolts configured, when tightened, to cause the plurality of first piercing contacts to make and maintain electrical contact with a conductor placed between the first block and the second block,
    wherein the second block is associated with a second circuit conductor lug having a plurality of second piercing contacts wherein the bolts connecting the first block to the second block are configured, when tightened, to cause the plurality of second piercing contacts to make electrical contact with the conductor located between the first block and the second block, and
    wherein the bolts are configured, when tightened, to further cause the plurality of second piercing contacts to pierce an armor surrounding the conductor, to pass through a jacket surrounding the conductor, and to pass through insulation surrounding the conductor before making electrical contact with the conductor located between the first block and the second block.

4. The piercing connector of claim 3, wherein the plurality of first piercing contacts are insulated so that the plurality of first piercing contacts only make electrical contact with the conductor and do not make electrical contact with the armor around the conductor.

5. The piercing connector of claim 3, wherein the plurality of second piercing contacts further comprise a second tab exterior to the piercing connector and in electrical connection with the plurality of second piercing contacts.

6. The piercing connector of claim 3, wherein the plurality of second piercing contacts are insulated so that the plurality of second piercing contacts only make electrical contact with the conductor and do not make electrical contact with the armor around the conductor.

7. The piercing connector of claim 3, wherein the second block is associated with a second ground conductor lug wherein the bolts are configured, when tightened, to further cause the second ground conductor lug to contact an armor around the conductor.

8. The piercing connector of claim 3, wherein the first block and the second block are made of a non-electrically conductive material.

9. The piercing connector of claim 3, wherein the first block and the second block are made of epoxy.

10. The piercing connector of claim 3, wherein the first block and the second block are made of porcelain.

11. The piercing connector of claim 3, wherein the bolts connecting the first block to the second block comprise torque bolts having heads configured to snap off when a predetermined amount of torque is applied to the heads.

12. The piercing connector of claim 3, wherein the plurality of first piercing contacts further comprise a first tab exterior to the piercing connector and in electrical connection with the plurality of first piercing contacts.

13. A piercing connector comprising:
    a first block associated with a first circuit conductor lug having a plurality of piercing contacts;
    a second block; and
    bolts connecting the first block to the second block, the bolts configured, when tightened, to cause the plurality of piercing contacts to make electrical contact with a conductor located between the first block and the second block,
    wherein the block is associated with a ground conductor lug wherein the bolts are configured, when tightened, to further cause the first ground conductor lug to contact an armor surrounding the conductor,
    wherein the first ground conductor lug further comprise a ground tab exterior to the piercing connector and in electrical connection with the ground conductor lug.

* * * * *